United States Patent [19]

Lefebvre et al.

[11] 4,056,769
[45] Nov. 1, 1977

[54] DIRECT CURRENT PROXIMITY DETECTOR HAVING SWITCHING MEANS WHICH PROVIDE ON TWO DISTINCT OUTPUTS, SIGNALS WHEN THE TARGET IS LOCATED BEYOND OR WITHIN A PREDETERMINED RANGE

[75] Inventors: Marcel Lefebvre; Alain Rouquet, both of Angouleme, France

[73] Assignee: La Telemecanique Electrique, France

[21] Appl. No.: 661,078

[22] Filed: Feb. 25, 1976

[30] Foreign Application Priority Data

Feb. 27, 1975 France .................................. 75.06091

[51] Int. Cl.² .......................................... G01R 33/12
[52] U.S. Cl. ...................................... 324/236; 331/65
[58] Field of Search ................... 324/41, 34 P, 34 D, 324/340; 331/65 R

[56] References Cited

U.S. PATENT DOCUMENTS 3,147,408  9/1964  Yamamoto et al. ................... 331/65
3,521,184  7/1970  Bowker ................................. 331/65

Primary Examiner—Robert J. Corcoran
Attorney, Agent, or Firm—William Anthony Drucker

[57] ABSTRACT

A direct current proximity detector having a first terminal directly connected, to a terminal of a supply source and second and third terminals connected to the other terminal of the supply source through a load, an oscillator associated with a detector of its state of oscillation, a voltage stabilizer and a static switching device. The switching device comprises first and second transistors, the conducting state of the respective transistors depending upon the state of a corresponding output of an inverter unit which is controlled by the detector. The two transistors are connected to the first terminal through a Zener diode, second and third terminals being interconnected by means of two serially connected diodes of opposed polarities the common point of which supplies the voltage stabilizer.

4 Claims, 3 Drawing Figures

DIRECT CURRENT PROXIMITY DETECTOR HAVING SWITCHING MEANS WHICH PROVIDE ON TWO DISTINCT OUTPUTS, SIGNALS WHEN THE TARGET IS LOCATED BEYOND OR WITHIN A PREDETERMINED RANGE

BACKGROUND AND BRIEF SUMMARY OF THE INVENTION

Numerous constructions of oscillator-operated, proximity detectors, which emit a signal only when the target object is at a distance greater than a predetermined value, are known. The present invention relates to a d.c. supplied proximity detector of the type having only two wires for connecting the supply source and the load circuit to the proximity detector, the latter being capable of emitting a signal as well when the target object is at a distance lower than a predetermined value, as when the target object is at a distance greater than the said predetermined value. This device has three terminals, the first being directly connected to one pole of the d.c. supply source, whilst the second and third terminals are connected to the other pole of the source through the load circuit. This detector comprises in per se known manner a transistorised oscillator associated with a detector of the oscillating generated by the oscillator, a voltage stabiliser comprising a transistor in series with a zener diode and static switching members.

The invention aims at permitting the said proximity detector to withstand large supply voltage variations, to suffer no damage in the case of erroneous polarities in the connection of components, and to ensure in all cases a clearly defined operation.

The device detects the close presence of a metal object by damping of the oscillation of its oscillator, and the second terminal operates as a closed contact when the object is not in close proximity, whereas the third terminal operates as a closed contact when the target object is in close proximity. This corresponds to safety operation because proximity cannot be confused with a failure in the power supply.

According to the invention, the said proximity detector is a static switching device comprising first and second transistors, the conductive state of one or other of the said transistors being controlled by the output state of an inverter in turn controlled by a detector, the two transistors being connected to a first terminal via a zener diode, second and third terminals being interconnected by means of two serially connected diodes of opposed polarities whose common point supplies, voltage stabiliser including a Zener diode the current flowing through the zener diode of the said stabiliser being determined by two resistors, one of which is connected to the second terminal and the other to the third terminal.

BRIEF DESCRIPTION OF THE DRAWINGS

These and further objects of the present invention will become apparent from the following description. In the accompanying drawings.

DETAILED DESCRIPTION OF THE PREFERRED EMBODIMENTS

Figure 1:
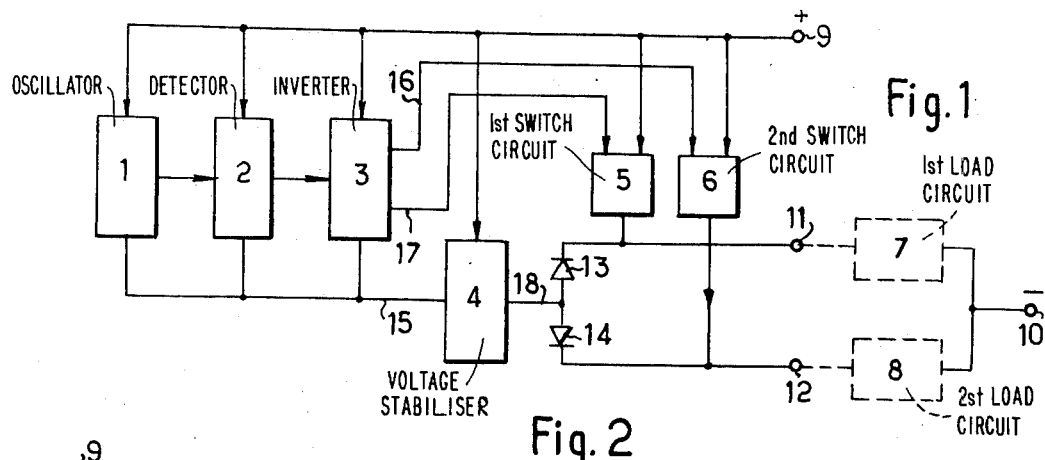
FIG. 1 shows a block diagram of a proximity detector according to a preferred embodiment of the invention.

In FIG. 1, 1 is an oscillator, 2 a detector of the conductive state of this oscillator, 3 an inverter, 4 a voltage stabiliser, 5 a first switching device, 6 a second switching device, 7 a first load circuit, 8 a second load circuit, 9 a first terminal connected to the positive pole of the source of supply, 10 the negative pole of the source of supply, 11 a second terminal, 12 a third terminal, 13 and 14 diodes aimed at reducing the possible interaction of the closing of switch 5 on terminal 11, as well as the interaction of the closing of switch 6 on terminal 12.

A circuit arrangement with reversed polarities, pole 9 being negative, pole 10 positive and diodes 13 and 14 reversed could also be designed.

Oscillator 1, detector 2 and inverter 3 are supplied with direct current which is regulated between points 9 and 15 by means of the stabiliser 4.

Inverter 3 has two outputs 16 and 17 which are respectively connected to control inputs of switches 6 and 5. The switches are supplied in the manner shown in FIG. 2 via a serially connected zener diode 23 preventing during its closure a too large voltage drop at the input of stabiliser 4, i.e. between points 9 and 18.

Figure 2:
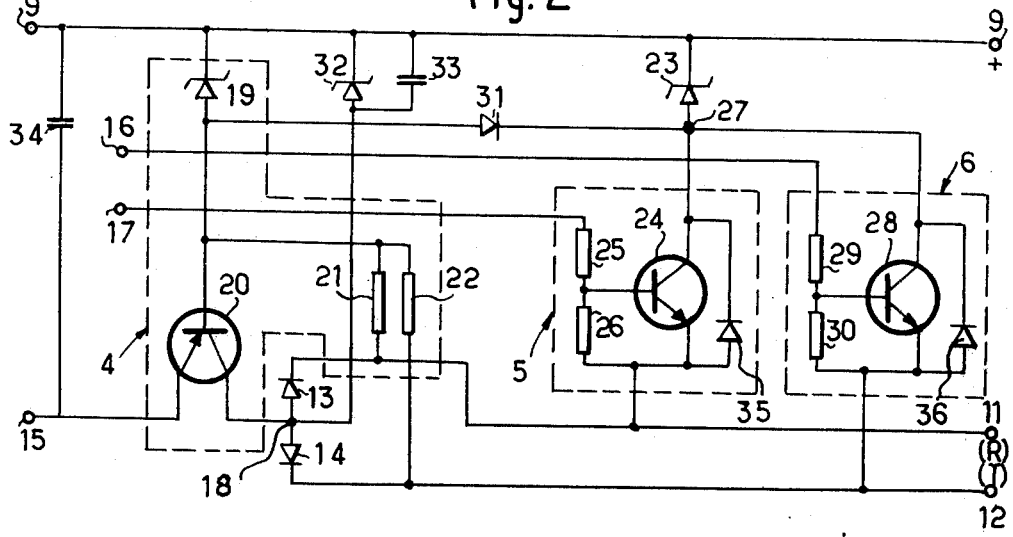
FIG. 2 is a detailed circuit diagram of a special embodiment of part of the circuit of FIG. 1.

In FIG. 2 the same reference numerals designate the same components as in FIG. 1, but for simplification purposes, units 1, 2, 3, 7 and 8 have been omitted.

Stabiliser 4 is of the per se known series transistor type. It comprises a transistor 20 and a zener diode 19 polarised beyond the bend of its characteristic curve by a resistor 21 or 22, depending on whether the load circuit is connected at terminal 11 or at terminal 12; the zener diode current is set to a low value in such a way that load circuits 7 or 8 (FIG. 1), which are for example relays, are not made to operate when one and/or the other switching device is open.

The switching devices 5 and 6 are connected to a common point 27, which is itself connected to the positive pole 9 via zener diode 23.

Switch 5 comprises a transistor 24 whose base can be controlled from a positive signal applied to the output terminal 17 of the inverter via the base resistor 25 and the base-emitter resistor 26. Analogously switch 6 comprises a transistor 28 and resistors 29,30. It is conductive when a positive signal is present on the output 16 of the inverter.

A diode 35 is connected in parallel with switching transistor and has a reverse polarity 24. In the same way a diode 36 is connected in parallel with transistor 28 and has a reverse polarity. These diodes prevent damage to the transistors in the case of an accidental polarity inversion at 9, 11 and 12.

An anti-interference capacitor 34 is connected between the stabilised voltage terminals 9–15. The system comprising zener diode 32 and the parallel capacitor 33 ensures the flow of interference currents induced by 9 on the one hand and by switch 5 or 6 towards the negative pole on the other hand.

A diode 31 connected between the anode of zener diode 19 of the stabiliser and the anode of the zener diode 23 in such a way that its cathode is at the common point 27 of the switching devices. The operation of the device described hereinbefore is as follows:

When the target object is at a distance from the detection head which is greater than the range, oscillator 1 oscillates and terminal 17 receives a signal from inverter 3 which makes transistor 24 conductive. Terminal 11 is then at the potential of the supply source, less the voltage drop in diode 23.

The voltage at the terminals of diode 23 ensures the presence of a voltage minimum at the input 18 of voltage stabiliser 4.

When the target object is at a distance less than the range, except for the hysteresis, terminal 16 receives in the manner indicated hereinafter a signal from the inverter. Transistor 28 of switch 6 then conducts and it results that terminal 12 is live. As described hereinbefore, zener diode 23 ensures the power supply of the oscillator which is then blocked but ready to operate.

With a view to reducing as far as possible the residual currents at terminals 11 and 12, resistors 21 and 22 should have comparatively large values. The voltage drops across zener diodes 19 and 23 cannot be accurately chosen to the desired values due to the dispersion of the characteristics of these diodes on manufacture. Consequently, particularly when the target object moves far enough away for the oscillator to function again, it may happen that the operating point of diode 19 being located under the bent portion of its characteristic curve the voltage at the terminals of this zener diode will tend to drop. Consequently, the range of the device is modified and this would normally lead to an unstable state of the arrangement. The function of diode 31 is to enable a current to flow therethrough, which will return the operating point of diode 19 back into the "zener portion of its characteristic curve", so that the unstable state is eliminated and switching is sharply defined.

When the target object comes within the range, taking account of hysteresis, the inverter continues for a certain time to supply a signal at 17 which makes transistor 28 conductive. Diode 31 reinforces the current passing through diode 19. The zener voltage of diode 19 is consequently slightly increased leading to an increase of the possible range and a sharply defined switching process.

Figure 3:
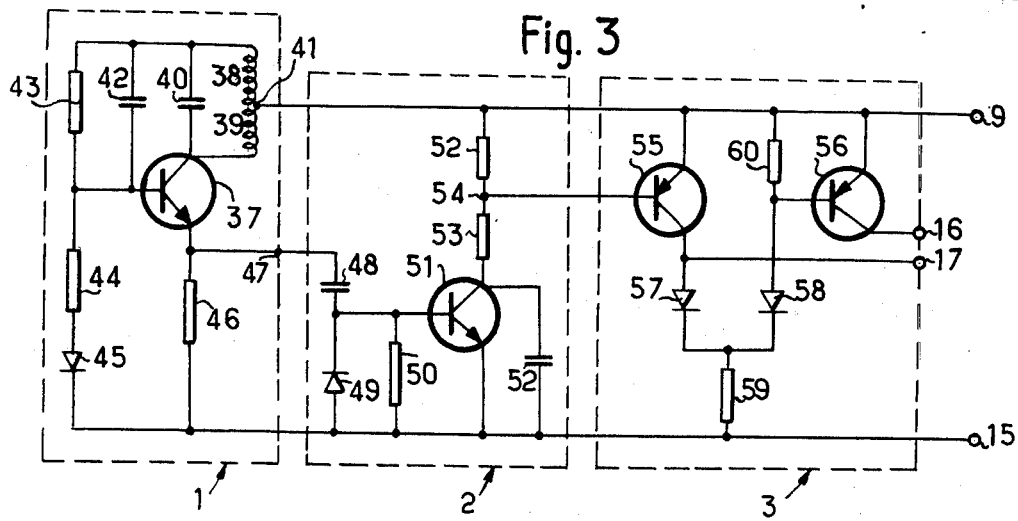
FIG. 3, is a detailed circuit diagram of a particular embodiment of another part of the circuit of FIG. 1.

Reference will now be made to FIG. 3 where oscillator 1 comprises a transistor 37, oscillator coils 38, 39, from which the not shown metal target moves closer or further away, and a tuning capacitor 40. The power supply is connected to the junction point 38, 39. The base of the transistor is polarised by resistors 43, 44 and a diode 45.

The emitter of transistor 37 is connected to the stabilised negative pole 15 by a resistor 46, at the terminal 47 of which may or may not be collected the oscillating output voltage, depending on whether the target object is remote or not.

Detector 2 comprises a transistor 51 whose base is excited by the high frequency current transmitted by a capacitor 48 and rectified by a diode 49 and a resistor 50.

When the oscillator is blocked, no voltage appears at the base of transistor 51, whereby the latter is then blocked and its collector is brought to the regulated positive potential 9, as well as the junction point 54 of the collector resistors 52, 53.

When the target object is sufficiently far away for the oscillator to operate, transistor 51 is periodically saturated. Its collector voltage drops. It is integrated by capacitor 52, whereby the voltage at terminal 54 drops.

Inverter 3 comprises transistors 55, 56, diodes 57, 58 and a resistor 60.

When the potential of input terminal 54 drops (target object remote), transistor 55 conducts via diode 57 and resistor 59. Diode 58 is blocked as is transistor 56. Only output 17 is then supplied with power. When the potential of point 55 is identified with that of point 9 (target object in close proximity), transistor 55 is blocked, transistor 56 becomes conductive so that terminal 16 is supplied with power.

Obviously various modifications can be made to the circuit described and represented hereinbefore without passing beyond the scope of the invention. More specifically, two serially connected diodes can be introduced between the base of transistor 20 and resistors 21 and 22 (FIG. 2) to avoid the passage of a current through these two resistors, which would also reduce the interaction between the switches and terminals 11 and 12.

What is claimed is:

1. A proximity detector comprising: a source of direct current supply having first and second terminal; first and second load circuits; first and second diodes having a common point, the first diode and the first load circuit being serially connected between the common point and the second terminal and the second diode and the second load circuit being serially connected between the common point and the second terminal; a voltage stabilising transistor having a current input, a current output and a control input, the said current output being connected to the said common point; a first Zener diode connecting the first terminal of the source to the said control input; an oscillator power supplied between the first terminal of the source and the current input of the voltage stabilising transistor and having a high frequency output; a detector power supplied between the first terminal of the source and the current input of the voltage stabilising transistor and having an input connected to the high frequency output of the oscillator and an output on which a control signal is generated when the oscillator is in an oscillating state; inverter means power supplied between the first terminal of the source and the current input of the voltage stabilising transistor and having an input connected to the output of the detector and first and second control outputs, said inverter means providing a signal on the first output thereof when the said control signal is present and a signal on the second output thereof when the said control signal is absent; first and second switching transistors each having a current input, a current output and a control input; a second Zener diode connecting the first terminal of the source to the current inputs of the first and second switching transistors, the current output of the first switching transistor being connected to the junction point between the serially connected first diode and first load circuit and the current output of the second switching transistor being connected to the junction point between the serially connected second diode and second load circuit, means connecting the control inputs of the first and second switching transistors respectively to the first and second control outputs of the inverter means; and first and second resistors respectively connecting the control input of the voltage stabilising transistor to the respective junction points between the serially connected first and second diodes and first and second load circuits.

2. A proximity detector according to claim 1, further comprising a third diode having an anode and a cathode, the anode being connected to the control input of the voltage stabilising transistor and the cathode being connected to the current inputs of the first and second switching transistors.

3. A proximity detector according to claim 1, wherein fourth and fifth diodes are respectively connected across the current input and current output of the respective switching transistors, the said fourth and fifth diodes being reversely poled with respect to the said switching transistors.

4. A proximity detector according to claim 1, wherein a third Zener diode shunted and oriented in the same direction as the first Zener diode is connected between the first terminal of the source and the said common point and a condenser is connected in parallel with the third Zener diode.

* * * * *